United States Patent [19]

Brandenstein et al.

[11] Patent Number: 4,571,222
[45] Date of Patent: Feb. 18, 1986

[54] TENSION ROLLER FOR BELT DRIVE

[75] Inventors: Manfred Brandenstein, Eussenheim; Roland Haas, Lendershausen; Rüdiger Hans, Niederwerrn; Wolfgang Friedrich, Schweinfurt, all of Fed. Rep. of Germany

[73] Assignee: SKF Kugellagerfabriken GmbH, Schweinfurt, Fed. Rep. of Germany

[21] Appl. No.: 484,161

[22] Filed: Apr. 12, 1983

[30] Foreign Application Priority Data

Apr. 17, 1982 [DE] Fed. Rep. of Germany ....... 3214231

[51] Int. Cl.⁴ ............................................. F16H 7/10
[52] U.S. Cl. ..................................... 474/112; 474/135
[58] Field of Search ................ 474/111, 112, 135, 138

[56] References Cited
U.S. PATENT DOCUMENTS 2,337,591 12/1943 Coulson ............................. 474/112
3,863,517 2/1975 Pareja ................................. 474/112

FOREIGN PATENT DOCUMENTS 2524744 12/1976 Fed. Rep. of Germany.

Primary Examiner—Stephen J. Novosad
Assistant Examiner—Bruce M. Kisliuk
Attorney, Agent, or Firm—Yuter, Rosen & Dainow

[57] ABSTRACT

A tension roller with a supporting member, pivoted on a pivot stud against the force of a tension spring, and rotatably supported in a roller sleeve by a bearing. The supporting member has a cylindrical interior space, limited by side walls, containing the tension spring. The side walls have bores for the pivot studs and recesses for formation of the stopping faces, against which the free ends of the tension spring abut in order to limit the angle of rotation of the tension roller. The member is made of synthetic material, using injection molding techniques. In order to produce this supporting member in an economical manner, additional recesses permitting insertion of a forming tool consisting of two halves are provided in the side walls of the member.

10 Claims, 3 Drawing Figures

TENSION ROLLER FOR BELT DRIVE

BACKGROUND OF THE INVENTION

The invention relates to a tension roller for a belt drive, of the type consisting of a supporting member eccentrically pivoted on a pivot stud and restrained by a tension spring. The support member has a roller sleeve rotatably disposed thereon by way of a bearing. The support member is formed with a cylindrical interior space limited by side walls, and containing the tension spring. Bores for the pivot stud are disposed in the side walls eccentric to the axis of rotation of the tension roller.

A tension roller of this type is depicted in the drawings of German patent document DE-OS No. 25 24 744. As illustrated therein, the design consists of a cup-shaped member and a cover plate. The bottom of the cup-shaped member and the cover plate have eccentrically disposed bores for a pivot stud. The bore is formed after the member and plate are joined. It is considerably more expensive and difficult to align the bores if they are formed individually in the member and plate. The ball bearing race, which is placed directly in the sleeve of the supporting member, and the weld seam are shown as being formed of metallic stock. Additionally, the known tension roller has a stop pin which must be separately made and installed and limits the swinging motion of the supporting member about the pivot stud.

Another disadvantage of this design is that both free ends of the tension spring are axially offset and, on assembly, must be inserted in corresponding bores of the supporting member pivot stud. This known tension roller is extremely costly to manufacture and assemble, resulting in a functional but expensive product.

SUMMARY OF THE INVENTION

The object of the present invention is to obtain a tension roller wherein the supporting member is inexpensive to manufacture and simple to assemble. This object is accomplished in that the disclosed supporting member is formed in one piece using injection molding techniques. The supporting member is formed with side walls having radially extending stopping faces limiting the swinging motion of the member about the pivot stud.

The stopping faces thus form the side walls of the supporting member and limit the swinging motion of the tension roller by way of a stopping device attached to the pivot stud.

According to another feature of the invention, additional recesses are provided in the other side wall of the supporting member, while the bore and recesses of one side wall and those of the other side wall are disposed complementary to one another to make up a complete circular surface.

In this embodiment the side walls of the supporting member are provided, not only with the bores for the pivot studs and the recess for formation of the stopping faces, but also with additional recesses in order to be able to properly configure the forming tool for the formation of a cylindrical interior space containing the tension spring, and then to axially remove it after injection of the supporting member. Sufficient struts or support sections advantageously remain to ensure reliable and stable seating of the supporting member on the pivot stud.

The one-piece design, made, for example, of synthetic material, results in an exceptionally economical and inexpensive supporting member which requires no additional work during assembly. The interior space for the tension spring, the eccentric bores for the pivot stud, the two stopping faces for limiting the swinging motion and a suitable shape of the sleeve for accommodating the bearing may be produced in a single operation with an appropriate forming tool.

In another embodiment of the invention, the free end of the tension spring fixed on the pivot stud is disposed to limit the swinging motion of the supporting member by the member's stopping faces. The free end of the tension spring, which is then radially offset and connected with the pivot stud, projects into the corresponding recess of the supporting member and, by contacting the stopping faces, limits the swinging motion of the tension roller. The inside peripheral width or arc of the recess then determines the free mobility of the free end of the tension spring and hence the range of angular movement.

According to still another feature of the invention, the supporting member is pressed into the bore of the bearing and axially fixed by edges resting against the lateral surfaces of the bearing.

In this way, standard commercial bearings may be mounted directly on the supporting member without additional attachment. In addition, it is possible to increase the wall thickness of the supporting member to adapt it to the wide variety of bore sizes of standard bearings. The additional weight of the supporting member is minimal since it is formed of synthetic material.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated a preferred embodiment of the invention.

DESCRIPTION OF THE PREFERRED EMBODIMENT

Figure 1:
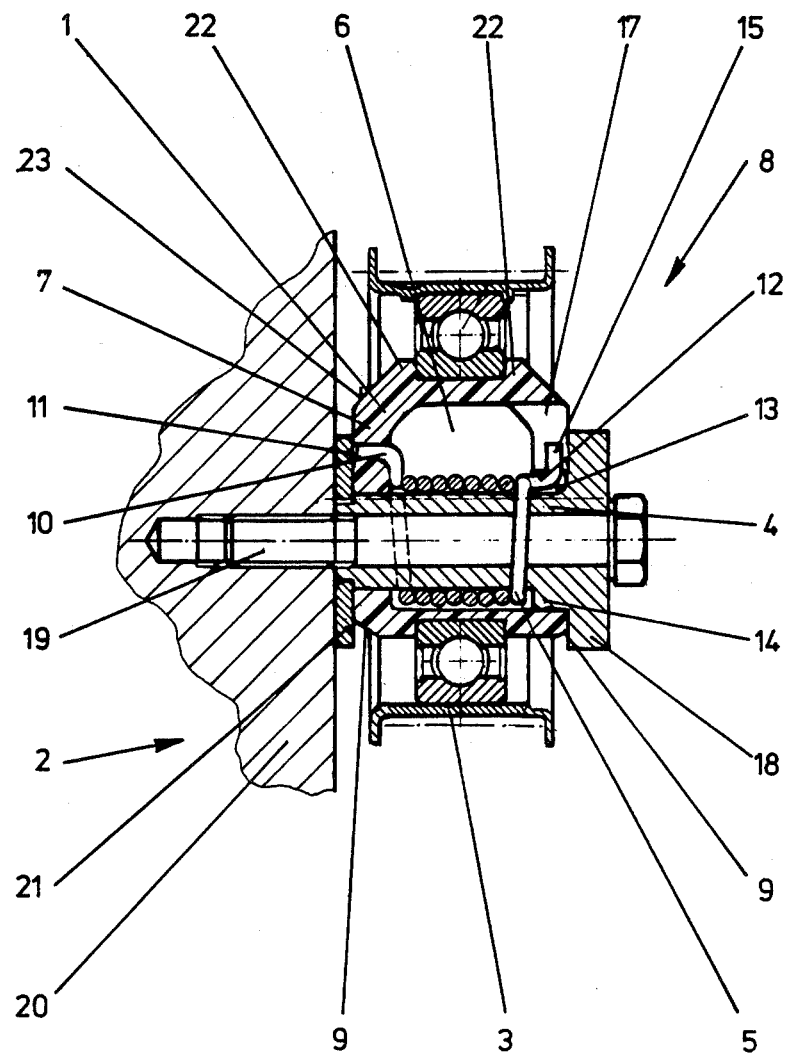
FIG. 1 shows a longitudinal section of a tension roller with a one-piece supporting member.

Referring to FIG. 1, a tension roller for a belt (not shown) comprises a supporting member 1 fitted in the bore of a ball bearing 2 which rotatably supports a roller sleeve 3. The supporting member 1, which is designed in one piece and is made, for example, of plastic using injection molding techniques, is eccentrically pivoted on a pivot stud 4. The swinging motion of the supporting member is restrained by tension spring 5, which is disposed concentrically on the pivot stud 4 in the cylindrical interior space 6 of member 1. Side walls 7 and 8 limit the cylindrical interior space 6 and are provided with eccentrically disposed bores 9 and 9'. As shown in FIG. 1, tension spring 5 has free ends 10 and 11. Free end 10 is axially offset in an outward direction and disposed in the left side wall 7 of the supporting member 1. The other free end 11 of the tension spring 5 is crooked and is likewise offset, first axially outward and then radially. The axially disposed section 12 of this free end lies in an axial groove 13 formed in edge section 14 of the pivot stud 4. The edge section 14 is designed with a greater diameter than that of the pivot stud 4. Radially extending section 15 of the free end 11 of the tension spring 5 extends from section 12 in the groove 13 of edge section 14 and projects into a sector-shaped recess 16 of the right side wall 8 (FIG. 2) of the supporting member 1. The sector-shaped recess results in stopping faces 17 and 17' which limit the swinging range of the supporting member 1 and hence of the tension roller on the pivot stud 4 in both directions when the radially extending section 15 contacts the faces 17. Tension spring 5 tightens when member 1 rotates or swings about pivot stud 4.

Pivot stud 4 is formed with an outlying flange 18 which has working surfaces (not shown) for a clamping tool. After the belt (not shown) is tightened, the tension roller is attached to a stationary housing 20 or the like by insertion of a bolt 19 though a bore in the pivot stud 4. A spacer disk 21 maintains the mounted tension roller at a predetermined distance from the attaching surface of the housing 20 and allows the roller to move within the swinging range about the pivot stud 4.

The supporting member 1 has integrally formed guide edges 22 and 22' for positioning of the ball bearing 2. A beveled sliding surface 23 facilitates pressing of the supporting member 1 into the bore of the ball bearing 2.

Figure 3:
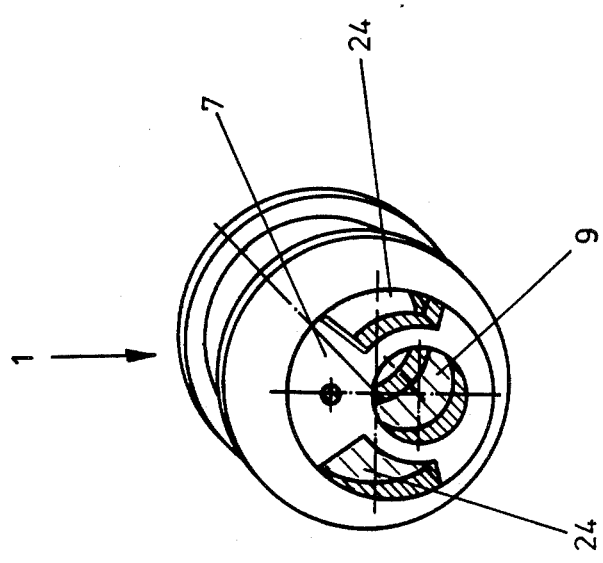
FIG. 3 is a perspective view of the supporting member of FIG. 1 as seen from the left side.
Figure 2:
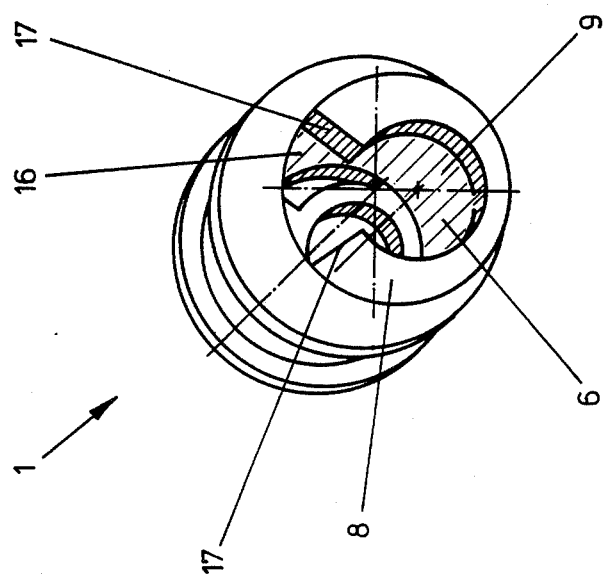
FIG. 2 is a perspective view of the supporting member of FIG. 1 as seen from the right side.

The perspective views of FIGS. 2 and 3 clearly show the structural design of the supporting member 1. The supporting member 1 is produced in one piece using injection molding techniques so that the cylindrical interior space 6 may be formed with simple tools. Additional recesses 24 and 24' shown in FIG. 3, are easily provided in the side wall 7.

The forming tool required for producing the supporting member 1 with the interior space 6 and the side walls 7, 8 consists essentially of two halves, one of which has the cross-sectional shape of the two recesses 24 and 24' shown in FIG. 3 and the other of which has the cross-sectional shape shown in FIG. 2. These sections include the bore 9 for the pivot stud 4 and the sector-shaped recess 16 for formation of the stopping faces 17 to limit the range of movement. These tool halves are brought together in opposition in the region of the interior space 6 of the supporting member 1 to make up a cylindrical tool section. The entire forming tool has additional partial sections forming the outer shape of the supporting member 1. After injection or molding of the synthetic material the two tool halves are linearly separated in an axial direction and removed from the formed supporting member 1.

The terms and expressions which have been employed are used as terms of description and not of limitation, and there is no intention of the use of such terms and expressions of excluding any equivalents of the features shown and described or portions thereof, it being recognized that various modifications within the scope of the invention can be made by one having ordinary skill in the art.

What is claimed is:

1. In a tension roller for a belt drive, comprising a one-piece injection molded supporting member, the supporting member having a cylindrical interior space axially limited by first and second side walls and radially limited by a bore surface, said first and second side walls having aligned eccentrically disposed bores formed therethrough, the supporting member being eccentrically pivoted on a pivot stud extending through said bores against the force of a tension spring, said tension spring having a first portion held to said second side wall, and a roller sleeve rotatably disposed on the supporting member by way of a bearing; the improvement wherein the first side wall has a recess with first and second circumferentially spaced radially extending stopping faces, said tension spring extending into said recess for limiting swinging motion of the roller with respect to the pivot stud by engagement of said stopping faces with the tension spring, said recess extending from the respective eccentrically disposed bore radially to the bore surface of said cylindrical interior space.

2. The tension roller of claim 1, wherein additional recesses are provided in the second side wall of the supporting member, the bore and recesses of the second side wall and the bore and the recess of the first side wall being complementary to one another to make up a complete surface.

3. The tension roller of claim 1, wherein the tension spring has a free end positioned to contact the stopping faces of the first side wall to limit and said swinging motion of the supporting member.

4. The tension roller of claim 1, wherein the bearing has a bore and lateral surfaces and the supporting member is pressed into the bore of the bearing and fixed axially by edges thereof resting against the lateral surfaces of the bearing.

5. The tension roller of claim 1, wherein the tension spring includes a radially extending arm positioned to engage the stopping faces to limit the swinging motion of the support member.

6. The tension roller of claim 2, wherein the bearing has a bore and lateral surfaces and the supporting member is pressed into the bore of the bearing and fixed axially by edges resting against the lateral surfaces of the bearing.

7. The tension roller of claim 2, wherein the tension spring has a free end positioned to contact the stopping faces of the first side wall to limit said swinging motion of the supporting member.

8. The tension roller of claim 3, wherein the free end includes a radially extending arm positioned to engage the stopping faces to limit the swinging motion of the support member.

9. The tension roller of claim 3, wherein said first portion of said tension spring comprises a second free end of the tension spring engaging the second side wall.

10. The tension roller of claim 7, wherein said first portion of said tension spring comprises a second free end of the tension spring engaging the second side wall.

* * * * *